United States Patent [19]

Roberts et al.

[11] Patent Number: 5,551,974
[45] Date of Patent: Sep. 3, 1996

[54] PROCESS FOR THE MALEATION OF POLYETHYLENE WAXES

[75] Inventors: Thomas D. Roberts; Kerry D. Muhlestein; Greg T. Slemons, all of Longview, Tex.

[73] Assignee: Eastman Chemical Company, Kingsport, Tenn.

[21] Appl. No.: 543,765

[22] Filed: Oct. 16, 1995

Related U.S. Application Data

[60] Continuation of Ser. No. 435,915, May 5, 1995, abandoned, which is a division of Ser. No. 168,542, Dec. 16, 1993, Pat. No. 5,420,303.

[51] Int. Cl.⁶ .................................................. L09D 191/06
[52] U.S. Cl. .................................. 106/271; 106/10
[58] Field of Search ................................ 549/233, 255; 525/285; 526/272; 106/271, 10

[56] References Cited

U.S. PATENT DOCUMENTS

| | | |
|---|---|---|
| 3,414,551 | 12/1968 | Reid et al. . |
| 3,416,990 | 12/1968 | Robinson . |
| 3,437,550 | 4/1969 | Paul . |
| 3,480,580 | 11/1969 | Joyner et al. . |
| 3,481,910 | 12/1969 | Brunson . |
| 3,483,276 | 12/1969 | Mahlman . |
| 3,642,722 | 2/1972 | Knowles et al. . |
| 3,746,676 | 7/1973 | Joyner et al. . |
| 3,862,265 | 1/1975 | Steinkamp et al. . |
| 3,928,687 | 12/1975 | Wada et al. . |
| 3,932,368 | 1/1976 | McConnell et al. . |
| 3,953,541 | 4/1976 | Fuji . |
| 4,003,874 | 1/1977 | Ide et al. . |
| 4,026,967 | 5/1977 | Flexman et al. . |
| 4,028,436 | 6/1977 | Bogan et al. . |
| 4,031,062 | 6/1977 | Shirayama et al. . |
| 4,071,494 | 1/1978 | Gaylord . |
| 4,078,017 | 3/1978 | Nagatoshi et al. . |
| 4,082,558 | 4/1978 | Nobuo .................. 106/271 |
| 4,218,263 | 8/1980 | Kawabata et al. . |
| 4,299,754 | 11/1981 | Shiomi et al. . |
| 4,315,863 | 2/1982 | Tomoshige et al. ......... 106/271 |
| 4,347,341 | 8/1982 | Bartl et al. . |
| 4,358,564 | 11/1982 | Ames . |
| 4,370,450 | 1/1983 | Grigo et al. . |
| 4,376,855 | 3/1983 | Ames . |
| 4,443,584 | 4/1984 | Michel . |
| 4,506,056 | 6/1985 | Gaylord . |
| 4,533,700 | 8/1985 | Mizui et al. . |
| 4,548,993 | 10/1985 | Garagnani et al. . |
| 4,612,155 | 9/1986 | Wong et al. . |
| 4,613,679 | 9/1986 | Mainord . |
| 4,624,992 | 11/1986 | Milani et al. . |
| 4,632,962 | 12/1986 | Gallucci . |
| 4,639,495 | 1/1987 | Waggoner . |
| 4,693,838 | 9/1987 | Varma et al. . |
| 4,727,120 | 2/1988 | Nogues . |
| 4,749,505 | 6/1988 | Chung et al. . |
| 4,751,270 | 6/1988 | Urawa et al. . |
| 4,762,890 | 8/1988 | Strait et al. . |
| 4,780,228 | 10/1988 | Gardiner et al. . |
| 4,822,688 | 4/1989 | Nogues . |
| 4,839,423 | 6/1989 | Moriya et al. . |
| 4,857,254 | 8/1989 | Wong . |
| 4,857,600 | 8/1989 | Gross et al. . |
| 4,877,841 | 10/1989 | Moriya et al. . |
| 4,879,347 | 11/1989 | Moriya et al. . |
| 4,927,888 | 5/1990 | Strait et al. . |
| 4,987,190 | 1/1991 | Keogh . |
| 5,001,197 | 3/1991 | Hendewerk . |
| 5,021,510 | 6/1991 | Vroomans . |
| 5,310,806 | 5/1994 | Wild et al. ................ 106/271 |

FOREIGN PATENT DOCUMENTS

| | | |
|---|---|---|
| 746086 | 11/1966 | Canada ................ 106/271 |
| 69015422 | 7/1969 | Japan . |
| 69015423 | 7/1969 | Japan . |
| 52-008035 | 1/1977 | Japan . |
| 52-093495 | 8/1977 | Japan . |
| 53-137292 | 11/1978 | Japan . |
| 55-034224 | 3/1980 | Japan . |
| 57-042736 | 3/1982 | Japan . |
| 59-105053 | 6/1984 | Japan . |
| 59-169530 | 9/1984 | Japan .................. 106/271 |
| 63-309540 | 12/1988 | Japan . |

OTHER PUBLICATIONS

"Polymer Chemistry" by M. P. Stevens (Addison Wesley) 1975, pp. 196–203.
"Maleation of Linear Low–Density Polyethylene by Reactive Process" by Norman G. Gaylord, (Journal of Applied Polymer Science) vol. 44, 1992.

Primary Examiner—David Brunsman
Attorney, Agent, or Firm—Mark A. Montgomery; Harry J. Gwinnell

[57] ABSTRACT

A process for the preparation of a maleated polyethylene wax is disclosed. This process entails mixing in the melt phase polyethylene, maleic anhydride, free radical initiator and a chain transfer agent m-di-isopropylbenzene. This process can be a continuous process either in a stirred reactor or twin screw extruder. The resulting maleated polyethylene wax has a high acid number, essentially no objectionable odor, and a Gardner color number less than 3.

7 Claims, No Drawings

PROCESS FOR THE MALEATION OF POLYETHYLENE WAXES

This is a file-wrapper continuation application of application Ser. No. 08/435,915, filed May 5, 1995 now abandoned which is a divisional of application 08/168,542 filed Dec. 16, 1993 which isssued as U.S. Pat. No. 5,420,303 on May 30, 1995.

FIELD OF THE INVENTION

The present invention relates to the process for the maleation of polyethylene to high acid number. The present invention also relates to the process for the continuous maleation of polyethylene. The present process produces maleated polyethylene waxes of low viscosity and high acid number with essentially no color or objectionable odor.

BACKGROUND OF THE INVENTION

Grafting of high and low molecular weight polymers has been reported often in the literature [see for example, polymer textbook "Polymer Chemistry" by M. P. Stevens, (Addison-Wesley), 1975, pp 196–202]. Maleation is a subgroup of grafting. Those skilled in the art recognize the highly individualistic nature of the maleation processes which have been patented. For example, maleation of polypropylenes progresses easily to higher acid numbers with free radical initiation (see U.S. Pat. Nos. 3,414,551, 3,480,580, 3,481,910, 3,642,722, 3,746,676, 3,932,368, and 4,613,679). The molecular weight of the products of such reactions are lower than that of the starting polypropylene due to accompanying degradation reactions. On the other hand direct maleation of polyethylenes results in crosslinking which increases the molecular weight of the polymer [see for example, "Journal of Applied Polymer Science", 44, 1941, N. G. Gaylord et al (1992); and U.S. Pat. Nos. 4,026,967, 4,028,436, 4,031,062, 4,071,494, 4,218,263, 4,315,863, 4,347,341, 4,358,564, 4,376,855, 4,506,056, 4,632,962, 4,780,228, 4,987,190, and 5,021,510]. Free radical initiated maleation of polyethylenes in continuous processes is limited to very low acid numbers in order to prevent gelation due to excessive crosslinking. Continuous processes provide lower cost commercial products. This means, that heretofore commercial maleated polyethylenes have been lower acid number since the maleation to high acid number in a continuous production unit forms high molecular weight gels that clog the reactor. Thermal maleations without the use of initiators is also employed for maleation of polyethylenes in order to minimize crosslinking. The lower acid numbered (10 or below) maleated polyethylenes which are offered commercially are prepared from molten polyethylene by a continuous thermal maleation process (no peroxide) at temperatures near or above 300° C. Free radical initiated maleation of polyethylenes to a high acid number using special reagents have been attempted in a batchwise process. However, the use of these special reagents produce a product that is high in color and/or gives off vapors offensive to humans handling the processing and use of this maleated product.

Different techniques of maleation yield different product types. Solid state maleations, those carried out below the melting point of the polymer, occur on the exposed surface of the solid. The acid numbers attained are necessarily a function of exposed surface area. Solvent based processes dissolve the polymer and produce a much more uniform maleated product [see U.S. Pat. Nos. 3,416,990, 3,437,550, 3,483,276, 3,928,687, 4,078,017, 4,299,754, 4,624,992, and 4,693,838 and Japanese Patents 59 105,053, 84 105,053 (1984), 69 15,422 (1969), 69 15,423 (1969), 77 93,495 (1977), 80 34,224 (1980), and 82 42,736 (1982). Solvent removal and recycling is an added expense of such processes however. An extruder serves as the reactor in some processes and provides some decrease in the molecular weight of the polymer due to mechanical tearing of the polymer chains [see U.S. Pat. Nos. 3,862,265, 4,003,874, 4,548,993, 4,639, 495, 4,751,270, 4,762,890, 4,857,600, 4,927,888, and 5,001, 197 and Japanese Patents JP 63,309,540, 88,309,540 (1988) and JP 78,137,292 (1978) and European Patent Application EP 280454 (Aug. 31, 1988)]. Some other processes resort to other chemical reactions such as oxidation or reaction with an alcohol or amine, either before maleation or after maleation, to provide unique products [see U.S. Pat. Nos. 4,443, 584 and 4,727,120 and Japanese Patent JP 77 08,035 (1975)]. In other processes copolymers are used to alter the change in molecular weight i.e. the increases in molecular weight, (maleation of polyethylenes), or the decreases in molecular weight (maleation of polypropylenes) (see U.S. Pat. Nos. 3,953,541, 4,533,700, 4,612,155, 4,749,505, and 4,822,688). Finally, the processes which are carried out in water must involve maleation with a mixture of maleic acid and maleic arthydride at best, and possibly involve maleic acid exclusively (see U.S. Pat. Nos. 4,370,450, 4,839,423, 4,877,841, and 4,879,347). The product of these aqueous processes are necessarily the carboxylic acids rather than the anhydrides which are obtained in other maleation reactions.

The maleated polyethylene waxes of high acid number would be very desirable in that higher acid numbers increase the emulsifiability of the waxes; the scuff and black heel mark resistance of floor polishes containing the waxes; and the adhesion of the waxes making them more useful as compatibilizing agents and surface coatings. However, attempts to produce high acid number polyethylene waxes that have essentially no color or objectionable odor have not been successful. Additionally, the commercialization of batchwise production of any high acid number polyethylenes has been impractical. Thus, it would be very desirable to be able to produce a useful high acid number maleated polyethylene. More particularly, it would be even more desirable and inexpensive if these were conducted in a continuous process adaptable to commercial production.

SUMMARY OF THE INVENTION

The process of the present invention for the preparation of a maleated polyethylene comprises mixing in the melt phase polyethylene homopolymer or copolymer containing less than 50 weight percent comonomer, at least 0.35 weight percent maleic anhydride, at least 0.05 weight percent of a free radical initiator, and at least 0.05 weight percent of m-di-isopropylbenzene, for a time to produce maleated polyethylene that is sufficiently maleated to an acid number greater than 2.

Additionally, the process of the present invention comprises a continuous process in which the above reactants are continuously introduced to the molten mixture and maleated polyethylene product is continuously removed.

The present invention further comprises an emulsion composition of:
  (a) about 10 to 30 weight percent of the low melt viscosity maleated polyethylene wax above,
  (b) a minor amount up to 15 weight percent of a surfactant, and
  (c) about 60 to 90 weight percent water.

DETAILED DESCRIPTION OF THE INVENTION

Applicants have unexpectedly discovered a process for the production of a high acid number maleated polyethylene wax. This process can unexpectedly be run continuously in a reactor without plugging of the reactor due to crosslinking. The crosslinking is unexpectedly absent due to the presence of m-di-isopropylbenzene, This process permits the production of a maleated polyethylene of high acid number that has essentially no color and no objectionable odor. These maleated polyethylene waxes of high acid number are very useful in the formation of dispersions or emulsions for use in floor polishes. These emulsions used in floor polishes provide good protection against black heel marks when applied as a floor polish.

The process for the preparation of a maleated polyethylene wax according to the present invention generally comprises mixing in the melt phase a polyethylene homopolymer or copolymer containing less than 50 weight percent comonomer, at least 0.35 weight percent maleic anhydride, at least 0.05 weight percent of a free radical initiator, and at least 0.05 weight percent of m-di-isopropylbenzene, for a time to produce maleated polyethylene that is sufficiently maleated to an acid number greater than 2.

The process according to the present invention is preferably conducted in the melt phase at a temperature of about 110° to 220° C., preferably 130° to 190° C. with a temperature of about 140° to 160° C. being most preferred. At temperatures much below 110° C. the reaction is significantly slowed and stirring or pumping is difficult. Whereas at temperatures much above 220° C. the polyethylene starts to crosslink by way of a new reaction mechanism.

The polyethylene reacted in the present invention has at least 50 weight percent ethylene and a weight average molecular weight of less than 150,000. The polyethylene reactant preferably contains at least 80 weight percent ethylene. More preferably at least 90, with a weight percent ethylene of about 100 weight percent being most preferred. Examples of suitable comonomers include propylene, butene, hexene, pentene, octene, heptene, decene, higher homologs, and geometric isomers thereof, with the comonomers propylene, butene, and hexene being preferred.

The polyethylene reactant also preferably has a starting molecular weight of less than 10,000. The polyethylene reactant at lower molecular weights is easier to stir and pump and produces a maleated polyethylene product of low molecular weight that is easier to emulsify.

The process of the present invention is preferably a continuous process in which the reactants; polyethylene, maleic anhydride, free radical initiator, and m-di-isopropylbenzene are continuously introduced into the molten mixture and maleated polyethylene product is continuously removed. One method of continuously maleating polyethylene according to the present invention can be in the melt phase in a screw extruder, preferably a twin screw extruder. When the continuous process is a screw extruder, the free radical initiator and m-di-isopropylbenzene are premixed and then added (by an injection port) to the molten polyethylene and maleic anhydride mixture.

Another method of continuously maleating polyethylene according to the present invention is in a stirred continuous reactor in which reactants are introduced at one end of the reactor and product is removed from the opposite end of the reactor. The residence time in the stirred continuous reactor is significantly longer than a twin screw extruder and is preferably at least 10 minutes, more preferably at least 14 minutes with a residence time of at least 17 minutes being most preferred. In order to produce maleated polyethylene product, the residence time of the reactants in a stirred continuous reactor is preferably about 17 to 39 minutes. In a stirred continuous reactor residence times of much less than 10 minutes would not provide enough reaction time to maleate the polyethylene and react all of the reactants since the mixing is less intimate than a screw extruder. This would also necessitate the removal of more unreacted maleic anhydride from the product. Additionally, extremely long residence times in a stirred continuous reactor are unnecessary since all reactants have already reacted. Thus, a residence time in which an entire volume of the stirred continuous reactor is replaced over 17 to 39 minutes is most preferred.

The amount of maleic anhydride used in the process according to the present invention is at least 0.35 weight percent, preferably at least 1.8 weight percent, more preferably at least 3 weight percent with a weight percent of maleic anhydride of about 4 to 7 weight percent being most preferred. Amounts of maleic anhydride much below 0.35 weight percent do not significantly maleate the polyethylene to a useful acid number, whereas dramatically high amounts of maleic anhydride simply require more elaborate removal of unreacted maleic anhydride from the product.

The free radical initiator used in the process of the present invention is preferably a peroxide. Suitable examples of peroxide include di-t-butylperoxide, di-(t-butylperoxyisopropyl)benzene, 2,5 -dimethyl-2,5-di-(t--butylperoxy)-3-hexene, benzoyl peroxide, and 2,5-dimethyl-2,5-di(t-butylperoxy)hexane with di-t-butylperoxide being most preferred.

The amount of peroxide used in the process of the present invention is at least 0.05 weight percent, preferably at least 0.3 weight percent more preferably at least 0.5 weight percent with a weight percent of peroxide of about 0.6 to 0.8 weight percent being most preferred. Amounts of peroxide much below 0.05 do not significantly react with the maleic anhydride and polyethylene to maleate the polyethylene to a significant extent. An amount of peroxide dramatically above what is disclosed is wasteful and does not significantly increase the maleation of polyethylene.

The amount of the m-di-isopropylbenzene used in the process of the present invention is at least 0.05 weight percent. This m-di-isopropylbenzene is believed to act as a chain transfer agent (CTA) preventing crosslinking of the polyethylene while adding no color and no objectionable odor to the maleated polyethylene product. The amount of this m-di-isopropylbenzene is preferably at a concentration of about 5 to 95 weight percent based on the total of free radical initiator and m-di-isopropylbenzene, more preferably 9 to 50, with a weight percent of about 10 to 15 being most preferred. Amounts much below 5 weight percent of m-di-isopropylbenzene based on the total of free radical initiator and m-di-isopropylbenzene are less useful in that certain amounts of crosslinking and gelling of the polyethylene occurs, whereas amounts much above 95 weight percent are in excess and do not significantly reduce any crosslinking of the polyethylene.

The amount of maleic arthydride to free radical initiator is in molar excess and the molar ratio of maleic anhydride to free radical initiator is preferably about 2 to 50, more preferably about 5 to 40, with a molar ratio of maleic anhydride to free radical initiator of about 10 to 19 being most preferred. Amounts of maleic anhydride much below the molar ratio of 2 are less useful and waste the excess free radical initiator and can cause crosslinking. Amounts of maleic anhydride in the molar ratio much above 50 are in excess of maleic anhydride and cannot be reacted with the free radical initiator and the polyethylene to maleate the polyethylene.

In the process according to the present invention, whether batch or the more preferred continuous process, the volatiles generally are removed from the maleated polyethylene. These volatiles are generally unreacted maleic anhydride. This method of removing volatiles is generally a continuous process and is conducted by passing an inert gas stream such as nitrogen over or through the molten mixture containing polyethylene. This process is preferably conducted by bubbling nitrogen thru the molten polyethylene mixture to remove volatiles.

Once the molten polyethylene has exited the reactor and volatiles removed, the maleated polyethylene is cooled to form a solid, this process is preferably one in which the maleated polyethylene is cooled and formed into solid particles such as pellets and pastels.

The maleated polyethylene wax composition produced according to the process of the present invention has an acid number of at least 2, essentially no objectionable odor and a Gardner color number less than 3. This maleated polyethylene wax composition preferably has an acid number of at least 7, more preferably at least 10 and even more preferred at least 22 with an acid number of at least 45 being most preferred. A preferred maleated polyethylene wax composition of the present invention thus is a low melt viscosity maleated polyethylene wax having an acid number of at least 7, essentially no objectionable odor and a Gardner color number less than 3.

This maleated polyethylene wax composition preferably has a Gardner color number less than 2, more preferably less than 1 with a Gardner color number of about 0 being most preferred. The lower the Gardner color number the less color is present in the resulting composition. A maleated polyethylene wax having a Gardner color number close to 0 is very desirable in that end users can freely incorporate this product into compositions without effecting the color of the resulting composition, thus having no dirty or dingy look to the resulting composition.

The composition produced according to the process of the present invention has essentially no objectionable odor, this means that the composition gives off no fowl smelling, or irritating odor and causes no tearing of operators processing the product.

The starting polyethylene utilized in the process of the present invention preferably has a melt index of at least 1.6 at 190° C., preferably at least 100° at 190° C. with a melt index of at least 1,000 at 190° C. being most preferred. The melt index is determined according to ASTM D 1238. A melt index much below 1.6 at 190° C. is difficult to process whereas a melt index significantly above 1,000 is very liquid and requires special handling.

The maleated polyethylene wax produced according to the process of the present invention preferably has a melt viscosity of less than 600 cP at 125° C. more preferably less than 300 cP at 125° C., with a melt viscosity of less than 225 cP at 125° C. being most preferred. The melt viscosity is also determined according to ASTM D 1238. A maleated polyethylene wax having a melt viscosity much below 200 cP at 125° C. is too liquid to easily handle whereas a maleated polyethylene wax having a melt viscosity much above 600 cP at 125° C. contains cross-links which mar the use properties.

The maleated polyethylene wax of the present invention is preferably formed into a dispersion or an emulsion containing water and surfactant. This emulsion preferably comprises about 10 to 30 weight percent of a maleated polyethylene wax having a melt viscosity of at least 200 cP at 125° C., a minor amount up to about 15 weight percent surfactant, and about 60 to 90 weight percent water.

The terms dispersion and emulsion are used interchangeably herein; however, if the maleated polyethylene wax is considered a solid then the term dispersion may be more appropriate.

The maleated polyethylene waxes produced according to the present invention are formed into emulsions according to the preferred process comprising mixing at an elevated temperature under neutral or basic conditions about 10 to 30 weight percent of the maleated polyethylene wax, a minor amount up to 15 weight percent of a surfactant, and about 60 to 90 weight percent water for a period of time sufficient to produce an emulsion of the maleated polyethylene wax.

The emulsion is preferably used in the form of a floor polish formulation and is applied to a substrate such as a floor and then dried to provide a clear tough floor finish that has improved scuff and black heel mark protection.

The temperature at which the emulsion is prepared is preferably between 160° and 180° C., more preferably between 165° and 178° C. with a temperature of about 170° to 175° C. being most preferred. The emulsion is prepared at neutral or basic pH. However, it is preferred that the pH be between 7 and 10, preferably between 9 and 10, with a pH between 9.5 and 9.7 being most preferred.

The emulsions prepared according to the present invention generally contain about 10 to 30 weight percent maleated polyethylene wax, preferably 20 to 27 weight percent, with a weight percent of maleated polyethylene wax of about 21 to 23 weight percent being most preferred. Amounts of maleated polyethylene wax much above about 30 weight percent and much below 10% are not as useful in applications.

The amount of surfactant used in the emulsions of the present invention can be as high as 15 weight percent but is preferably between 5 and 10 weight percent with a weight percent of about 6 to 8 being more preferred. Amounts much over 15 weight percent are not needed to render the amount of maleated polyethylene wax dispersible in the water. However, minor amounts below 3 weight percent do not adequately disperse the maleated polyethylene wax. Any surfactant that forms a dispersion or emulsion of the present system would be useful herein. Examples of suitable surfactants include Igepal CO-630, Igepal CO-710, nonylphenyl, and ethoxylated alcohols such as Tergitol 15-S-9 and Tergitol 15-S-12.

The amount of water generally varies, depending upon the desired concentration, but is generally between 60 and 90 weight percent, preferably between 65 and 80 weight percent, with a weight percent of about 70 to 79 weight percent water being most preferred. A base is generally added to the emulsion to render the aqueous solution basic. Amounts of base generally range from about 1 to 3 weight percent and are generally selected from standard bases such as tertiary amines and potassium hydroxide. Amounts of base can range from about 0.05 to 3 weight percent, but are preferably about 0.75 to 1.5 weight percent, more preferably 0.8 to 1.2 weight percent, with about 1 weight percent base being most preferred.

The emulsion can also contain other ingredients such as bleaching agents or whitening agents such as sodium metabisulfite in concentrations as high as 0.34 weight percent. The bleaching agent is preferably in the range of 0.1 to 0.34 weight percent, more preferably 0.15 to 0.34 with an amount of bleaching agent of about 0.29 to 0.31 being most preferred. The bleaching agent or whitening agent is generally not needed. However, minor amounts often do decrease the color.

The floor polishes of the present invention are generally emulsions of the maleated polyethylene wax but generally contain additional materials as used in standard floor polishes such as coalescing aids, acrylic polymers, plasticizers and other waxes. The amounts of coalescing aids such as glycol ethers can vary from 1 to 10 weight percent, preferably 1 to 8 weight percent with an amount of about 4 weight percent being most preferred. The amount of acrylic polymers such as styrene acrylic copolymers can vary from 10 to 20 weight percent, preferably 8 to 15 weight percent with an amount of about 6 to 12 weight percent being most preferred. The plasticizers can vary from 1 to 5 weight percent, preferably 1 to 4 weight percent with an amount of about 1.5 to 3 weight percent being most preferred. The amounts of heating mantle to maintain a temperature of 160° C. A dropping funnel which was nitrogen swept or blanketed was used to add a mixture of maleic arthydride (MA) and di-t-butyl peroxide (DTBP) in acetone to the reaction flask. Volatiles exited the reactor via a Dean/Stark trap and reflux condenser. Reaction amounts and product properties are noted in Table 1. All viscosities were taken at 125° C.

In each run 2000 g of Epolene N14 (a low molecular weight polyethylene from Eastman Chemical Co.) was reacted with 65 g of MA and varying from 12 to 14 g of DTBP to provide 22 to 23 acid number (440 to 561 cP melt viscosity at 125° C.) products. Addition time of the MA/DTBP mixture was 0.5 hr. followed by 0.5 hr. of continued stirring and 0.5 hour of stripping with a rapid stream of nitrogen. Ring and ball softening point (RBSP) varied from 105° to 106° C. Table 1 provides the data.

TABLE 1

Batchwise Free Radical Initiated Maleation of 2,000 g. Epolene N14* at 160° C.

| | | | | | | | Product Properties | |
|---|---|---|---|---|---|---|---|---|
| | g. | g. | | Times, Hr. | | | Acid | Melt Visc. | RBSP |
| Run | MA | DTBP | Acetone | Add | Stir | Strip | Number | 125° C. | in °C. |
| 1 | 65 | 14 | 50 | .5 | .5 | 1 | 22.9 | 440 | 106.0 |
| 2 | 65 | 13 | 50 | .5 | .5 | 1 | 21.8 | 523 | 105.3 |
| 3 | 65 | 12 | 50 | .5 | .5 | 1 | 22.8 | 541 | 105.4 |
| 4 | 65 | 12 | 50 | .5 | .5 | 1 | 21.9 | 532 | 105.0 |
| 5 | 65 | 14 | 50 | .5 | .5 | 1 | 22.2 | 561 | 105.2 |

*Epolene N14 (100% ethylene) had the following properties:
RBSP = 106° C.
Pencil Hardness = 3
Density = 92
Melt Viscosity = 150 cP @ 125° C.
Gardner Color 1
MW = 1800
Cloud Point = 77 other waxes can vary from 0.4 to 3 weight percent, preferably 0.5 to 2 weight percent with an amount of about 1.2 to 1.5 weight percent being most preferred.

Other materials that can be present in the floor polishes include preservatives, silicone antifoam agent, fluocarbon surfactant, and zinc oxide.

Floor finishes produced from the floor polish formulations using the maleated polyethylene waxes of the present invention have improved scuff and black heel mark protection when compared to floor polishes without this wax.

The floor finishes can be obtained by applying the floor polish formulations by standard methods such as applying to the substrate and drying. The dry coating can also be buffed.

The following examples are intended to illustrate the present invention but are not intended to limit the reasonable scope thereof.

EXAMPLES

Example 1

(Comparative) Batchwise Production, No CTA

This experiment was carried out in a 4 liter resin reaction flask with a motor driven stirrer and a thermocouple leading to a Parr controller which governed the voltage to the Example 2

(Comparative) Continuous Production

The batchwise example above was attempted in the following continuous process:

A continuous maleation pilot plant was utilized in this Example and was composed of a heated melt tank, a heated feed tank, a baffled Parr reactor configured with two inlets and one outlet, a heated product tank, a nitrogen scrubber system, and heated and insulated connecting lines and valves. The melt tank holds about 300 pounds of molten feed under nitrogen pressure of 10 to 50 psig at up to 180° C. The smaller feed tank holds about 150 pounds of molten feed at similar pressures and temperatures up to 200° C. Nitrogen pressure was used to transfer molten feed from the melt tank to the feed tank. Two Zenith pumps were used to transfer molten feed via two different lines to either the top or bottom of the reactor. Molten maleic anhydride was pumped by a shop fashioned motor driven/chain drive Ruska pump into one of the molten feed lines and subsequently into the bottom of the reactor. The other molten feed line was routed to the top of the reactor and fed via a dip tube to near the bottom of the reactor. In addition a diaphragm pulse-feeder pump was used to pump peroxide feed into the bottom of the reactor. The reactor had a working volume of about 280 ml. Thus, if a measured 10 ml./minute of product exited the reactor, then the resident time was about 28 minutes. The molten product was passed into a nitrogen gas scrubber and subsequently into a product tank from which product was drained each hour to solidify in air. The gaseous by-products were entrained in the nitrogen stream and passed into a water scrubber.

Maleation of Epolene N14 was carried out by pumping approximately 10 g/min. of molten wax, 0.8 ml of a 10% by volume solution of di-t-butyl peroxide (0.08 ml, 0.063 g, 0.000433 mole) in mineral spirits, and 0.2 ml (0.26 g, 0.00265 mole) of molten maleic anhydride per minute into the reactor at 160° C. Analysis of the white, waxy product provided an acid number of 19 (mean value) and a melt viscosity of 216 cP (mean value) at 125° C.

After a total of 60 hours of operation the pressure in the reactor increased from about 45 psig to over 100 psig so that the reactor became inoperable. The opened reactor was found to be filled with a brown solid which did not melt when heated. The infrared spectrum of this solid contained the bands of maleated polyethylene.

Example 3

(Comparative) Continuous production with added CTA's.

The continuous unit described above in Example 2 was used in this example. Tetralin was used as a chain-transfer agent. Maleation was carried out by pumping 11.4–11.6 g/min. of Epolene N14 into the reactor along with 0.4–0.5 ml. of molten maleic anhydride (MA) and 0.6–0.8 ml. of a 11.6 weight percent solution of di-t-butyl peroxide (DTBP) in tetralin. The reactor was operated for over two weeks without any evidence of clogging. When the reactor was opened none of the cross-linked polyethylene noted above was found, however, an odor of tetralin remained with the maleated product, even after 2 months of storage in air.

Table 2 shows the operating parameters.

TABLE 2

Continuous Maleation of Epolene N14 (Mean Values)

| Opera-ting Hours | Feed Rates | | | | Ratio, moles | Product Properties | |
|---|---|---|---|---|---|---|---|
| | MA | | Peroxide | | MA/ | Acid | Viscos- |
| | g/min. | moles/min. | g/min. | moles/min. | moles perox. | Number | ity cP @ 125° C. |
| 150 | 0.70 | 0.0071 | 0.055 | 0.00038 | 18.7 | 22.5 | 200 |
| 50 | 0.64 | 0.0065 | 0.071 | 0.00053 | 12.3 | 19.9 | 195 |
| 91 | 0.52 | 0.0053 | 0.075 | 0.00051 | 10.4 | 18.9 | 195 |

Example 4

Continuous Production With Added CTA's

Additional CTA's were added to a continuous process as above with Example 3 with the same amounts and conditions except that tetralin was substituted with each CTA shown in Table 3. A summary of all the CTA work is shown in Table 3.

TABLE 3

Maleation of Epolene N14 Using CTA's

| CTA Used | Results |
|---|---|
| none | Reactor clogged in 2 days |
| tetralin | No clogging; odor objectionable |
| 2-butanone | Reactor clogged in 2 days |

TABLE 3-continued

Maleation of Epolene N14 Using CTA's

| CTA Used | Results |
|---|---|
| ethyl acetoacetate | No clogging; product yellow in color |
| benzaldehyde | No clogging; product orange in color |
| 2-ethylhexanol | No clogging; product yellow in color |
| m-di-isopropyl-benzene | No clogging; product near white in color |

The example using m-di-isopropylbenzene as the CTA was used to obtain information on trends of product characteristics in this continuous process. The melt viscosity shows a strong positive correlation to the ratio of peroxide to wax. Very small positive correlations of both residence time and temperature to melt viscosity were noted. Likewise a small negative correlation of the peroxide to wax ratio was noted for the acid number. The best set of conditions and feeds found in this example (160° C., 17 minute residence time, and 0.8 weight percent peroxide/wax with the peroxide 13 weight percent in m-di-isopropylbenzene) provided 303 cP melt viscosity at 125° C. product with an acid number of 28.

During this experiment with m-di-isopropylbenzene as CTA products with up to 45 acid number were produced without any evidence of clogging. Emulsions prepared from this 45 acid numbered maleated polyethylene were more stable than those prepared from 25 acid numbered product.

Example 5

Batchwise Maleation of Epolene N14 Using other Hydrocarbon CTA's

Additional CTA's were added in a batchwise process identical to Example 1 (results should be similar in a continuous process). The results are shown in Table 4.

TABLE 4

Maleation of Epolene N14 Using Other Hydrocarbon CTA's

| CTA Used | Acid # | RBSP | Gardner Color | Aldrich Rating | Melt Viscosity cP at 125° C. |
|---|---|---|---|---|---|
| m-di-isopropyl-benzene | 20 | 104 | 0 | — | 420 |
| 1,3,5-trimethyl-benzene | 21 | 104 | 2–3 | Irritant | 360 |
| 1,2,4-trimethyl-benzene | 20 | 104 | 2 | Irritant | 332 |
| 1,2,3-trimethyl-benzene | 20 | | 3 | Irritant | 347 |
| Isopropylbenzene | 20 | 104 | 2 | Irritant | 362 |

Discussion

The above examples show that only the use of m-di-isopropylbenzene permitted the continuous maleation of polyethylene waxes to produce the desired high acid number maleated polyethylene with essentially no color or objectionable odor. Without the addition of a CTA, the batchwise maleation of polyethylene could not be converted to a continuous process without clogging. As is clearly shown, not all attempted CTAs prevent the clogging of a continuous process reactor e.g. ketones. Additionally, although aldehydes, ketoesters, tetralin and compounds somewhat related to m-di-isopropylbenzene permitted the continuous maleation of polyethylene, the resulting product was colored and or produced an offensive odor.

We claim:

1. An emulsion composition comprising:
   (a) about 10 to 30 weight percent of a low melt viscosity maleated polyethylene wax having a melt visocosity of less than 600 cP at 125° C., an acid number of at least 7, essentially no objectionable odor, and a Garden color number less than 3,
   (b) a minor amount up to 15 weight percent of a surfactant, and
   (c) about 60 to 90 weight percent water.

2. The emulsion composition according to claim 1 wherein the composition has a neutral or basic pH.

3. The composition according to claim 1 wherein the maleated polyethylene wax is in a concentration of about 20 to 27 weight percent.

4. The composition according to claim 1 wherein the amount of surfactant used is about 5 to 10 weight percent.

5. The composition according to claim 1 wherein the amount of water used is about 73 to 80 weight percent.

6. The composition according to claim 1 further comprising at least one bleaching agent.

7. The emulsion composition according to claim 1 wherein the low melt viscosity maleated polyethylene was of (a) also contains m-di-isopropylbenzene.

* * * * *